United States Patent
Marciante

(10) Patent No.: US 11,726,341 B2
(45) Date of Patent: *Aug. 15, 2023

(54) METHOD AND SYSTEM FOR MULTISPECTRAL BEAM COMBINER

(71) Applicant: RAM Photonics LLC, San Diego, CA (US)

(72) Inventor: John R. Marciante, Webster, NY (US)

(73) Assignee: RAM Photonics Industrial, LLC, Webster, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/159,313

(22) Filed: Jan. 27, 2021

(65) Prior Publication Data

US 2021/0223561 A1  Jul. 22, 2021

Related U.S. Application Data

(60) Continuation of application No. 16/738,784, filed on Jan. 9, 2020, now Pat. No. 10,935,802, which is a (Continued)

(51) Int. Cl.
| | |
|---|---|
| *G02B 27/10* | (2006.01) |
| *H01S 3/00* | (2006.01) |
| *H01S 3/23* | (2006.01) |
| *G02B 27/30* | (2006.01) |
| *G02B 17/08* | (2006.01) |
| *G02B 27/42* | (2006.01) |

(Continued)

(52) U.S. Cl.
CPC ....... *G02B 27/1006* (2013.01); *G02B 17/086* (2013.01); *G02B 27/30* (2013.01); *G02B 27/4233* (2013.01); *H01S 3/0675* (2013.01); *H01S 3/07* (2013.01); *H01S 3/08059* (2013.01); *H01S 3/2391* (2013.01); *H01S 3/005* (2013.01); *H01S 3/0812* (2013.01); *H01S 3/0815* (2013.01)

(58) Field of Classification Search
CPC .. G02B 27/1006; G02B 17/086; G02B 27/30; G02B 27/4233; H01S 3/0675; H01S 3/07; H01S 3/08059; H01S 3/2391; H01S 3/005; H01S 3/0812; H01S 3/0815
See application file for complete search history.

(56) References Cited

U.S. PATENT DOCUMENTS 5,496,309 A * 3/1996 Saadat ................... A61B 18/24
                                                            606/7
6,411,424 B1    6/2002 Raj
(Continued)

OTHER PUBLICATIONS

U.S. Appl. No. 15/272,686, Final Office Action, dated Apr. 16, 2019, 11 pages.
(Continued)

*Primary Examiner* — Xinning(Tom) Niu
(74) *Attorney, Agent, or Firm* — Kilpatrick Townsend & Stockton LLP

(57) ABSTRACT

A spectral beam combining system includes a plurality of input fibers and a prism having a curved input surface. The plurality of input fibers are attached to the curved input surface. The spectral beam combining system also includes an immersion grating defined on a second surface of the prism, a protective cap disposed over the immersion grating, and an output surface.

19 Claims, 16 Drawing Sheets

Related U.S. Application Data division of application No. 15/272,686, filed on Sep. 22, 2016, now Pat. No. 10,551,626.

(60) Provisional application No. 62/222,103, filed on Sep. 22, 2015.

(51) Int. Cl.
*H01S 3/067* (2006.01)
*H01S 3/07* (2006.01)
*H01S 3/08* (2023.01)
*H01S 3/081* (2006.01)

(56) References Cited

U.S. PATENT DOCUMENTS

| | | | |
|---|---|---|---|
| 9,620,933 B1* | 4/2017 | Huang | H01S 5/4087 |
| 10,551,626 B2 | 2/2020 | Marciante | |
| 10,935,802 B2 | 3/2021 | Marciante | |
| 2002/0176151 A1 | 11/2002 | Moon et al. | |
| 2004/0008416 A1* | 1/2004 | Okuno | G02B 5/3058 |
| | | | 359/566 |
| 2007/0127123 A1* | 6/2007 | Brown | G02B 27/144 |
| | | | 359/556 |
| 2011/0216792 A1* | 9/2011 | Chann | H01S 5/405 |
| | | | 372/31 |
| 2017/0082863 A1 | 3/2017 | Marciante | |

OTHER PUBLICATIONS

U.S. Appl. No. 15/272,686, Non Final Office Action, dated Sep. 5, 2018, 9 pages.
U.S. Appl. No. 15/272,686, Notice of Allowance, dated Sep. 18, 2019, 8 pages.
U.S. Appl. No. 15/272,686, Restriction Requirement, dated Jun. 15, 2018, 6 pages.
U.S. Appl. No. 16/738,784, Non-Final Office Action, dated May 21, 2020, 14 pages.
U.S. Appl. No. 16/738,784, Notice of Allowance, dated Oct. 27, 2020, 8 pages.

* cited by examiner

METHOD AND SYSTEM FOR MULTISPECTRAL BEAM COMBINER

CROSS-REFERENCES TO RELATED APPLICATIONS

This application is a continuation of U.S. patent application Ser. No. 16/738,784, filed Jan. 9, 2020, entitled "Method and System for Multispectral Beam Combiner," which is a divisional of U.S. patent application Ser. No. 15/272,686, filed Sep. 22, 2016, entitled "Method and System for Multispectral Beam Combiner," now U.S. Pat. No. 10,551,626, which claims priority to U.S. Provisional Patent Application No. 62/222,103, filed on Sep. 22, 2015, entitled "Method and System for Multispectral Beam Combiner," the disclosures of which are hereby incorporated by reference in their entirety for all purposes.

BACKGROUND OF THE INVENTION

The output power of a laser system is limited by thermal, nonlinear, and material effects. The effectiveness of lasers is largely determined by the brightness of the laser, coarsely defined as the ratio of the output power to the two-dimensional beam parameter product (i.e., the product of the beam area and the beam divergence). In order to overcome the output power limitation, simply adding laser beams together is insufficient to guarantee good beam quality. Typically, adding laser beams together will yield a spatially incoherent beam, which will result in reduced beam quality and a beam brightness that is, at best, equal to that of the individual beams, i.e. no brightness improvement. One skilled in the art recognizes that the term laser can comprise a laser oscillator, a laser amplifier, or a set of laser oscillators or amplifiers.

SUMMARY OF THE INVENTION

Embodiments of the invention generally relate to the field of optics. More specifically, embodiments of the present invention relate to optical beam combination systems. In a particular embodiment, an immersion grating prism is utilized to provide a monolithic beam combination system suitable for use with high power lasers. The invention has wider applicability, including other beam combination applications.

According to an embodiment of the present invention, a multispectral beam combiner is provided. The multispectral beam combiner includes a prism body having an output surface and a fiber entry block attached to the prism body. The multispectral beam combiner also includes a plurality of input fibers attached to the fiber entry block. Each of the plurality of input fibers is operable to support a different wavelength. The multispectral beam combiner further includes a collimator attached to the prism body. The collimator is operable to reflect and collimate light propagating from the fiber entry block. The multispectral beam combiner additionally includes an immersion grating operable to diffract light propagating from the collimator. The output surface of the prism body is operable to pass light propagating from the immersion grating. In some embodiments, the light propagating from the collimator impinges on the immersion grating at differing angles associated with the different wavelength of each of the plurality of input fibers.

According to another embodiment of the present invention, a spectral beam combining system is provided. The spectral beam combining system includes a prism having an input surface operable to receive a plurality of input beams and an immersion grating defined on a second surface of the prism. The spectral beam combining system also includes an output surface.

The spectral beam combining system can also include a plurality of input fibers coupled to the input surface. Each of the plurality of input fibers can be attached, for example, optically bonded, to the input surface. In an embodiment, the plurality of input fibers are arrayed radially in the dispersion plane with a center disposed at the immersion grating. The spectral beam combining system can further include a protective cap disposed over the immersion grating. The protective cap can define a gas-filled gap between the immersion grating and the protective cap.

According to yet another embodiment of the present invention, a spectral beam combining system is provided. The spectral beam combining system includes a plurality of input fibers, a prism having a curved input surface, wherein the plurality of input fibers are attached to the curved input surface, and an immersion grating defined on a second surface of the prism. The spectral beam combining system also includes a protective cap disposed over the immersion grating and an output surface.

According to a specific embodiment of the present invention, a spectral beam combining system is provided. The spectral beam combining system includes a plurality of input fibers and a prism having a curved input surface, a reflective surface, and a curved output surface. The plurality of input fibers are attached to the curved input surface. The spectral beam combining system also includes an immersion grating defined on a second surface of the prism and a protective cap disposed over the immersion grating. Light diffracted from the immersion grating reflects off the reflective surface and passes through the output surface. The output surface can be curved and can be partially reflective.

In an embodiment, the reflective surface is substantially opposite to the second surface. The plurality of input fibers can be operable to deliver a plurality of laser beams, each of the plurality of laser beams characterized by a different wavelength. In an embodiment, the plurality of input fibers are arrayed radially with a center disposed at the immersion grating. The protective cap can define a gas-filled gap between the immersion grating and the protective cap. In an embodiment, an optical path is defined between the immersion grating and the output surface. The optical path extends from the immersion grating to the reflective surface to the output surface.

According to another specific embodiment of the present invention, a spectral beam combining system is provided. The spectral beam combining system includes a plurality of input fibers and a prism. The prism has a curved input surface. The plurality of input fibers are attached to the curved input surface. The prism also has a second surface having a first immersion grating defined on the second surface, a third surface having a second immersion grating defined on the third surface, and a curved output surface, which can be partially reflective. The third surface can be substantially opposite to the second surface.

The spectral beam combining system can further include a first protective cap disposed over the first immersion grating and a second protective cap disposed over the second immersion grating. In an embodiment, the first protective cap defines a first gas-filled gap between the first immersion grating and the first protective cap and the second protective cap defines a second gas-filled gap between the second immersion grating and the second protective cap.

The plurality of input fibers can be operable to deliver a plurality of laser beams, each of the plurality of laser beams characterized by a different wavelength. Additionally, the plurality of input fibers can be arrayed radially with a center disposed at the first immersion grating.

Numerous benefits are achieved by way of the present invention over conventional techniques. For example, embodiments of the present invention provide methods and systems that do not require any mechanical or vibrational stabilization, and protect all of the optical surfaces from dust, moisture, and other environmental contaminants. Embodiments of the present invention therefore provide substantial improvements in terms of cost, size, weight, and complexity over existing beam combination systems. These and other embodiments of the invention along with many of its advantages and features are described in more detail in conjunction with the text below and attached figures.

DETAILED DESCRIPTION OF SPECIFIC EMBODIMENTS

Notionally, there are two primary methods to combine lasers that can increase their collective brightness. The first method is coherent beam combination (CBC). In this method, individual lasers are engineered to be coherent with each other. Due to their coherence, if the beams of individual lasers are arranged precisely next to each other, they effectively become a single beam since there is no measurement that can distinguish between them. In order for CBC to be successful, it is imperative that the individual lasers be highly coherent with each other, which is a challenging task, particularly in a non-laboratory environment. Hence, this approach has not been adopted for reliable commercial-grade systems.

Figure 1A:
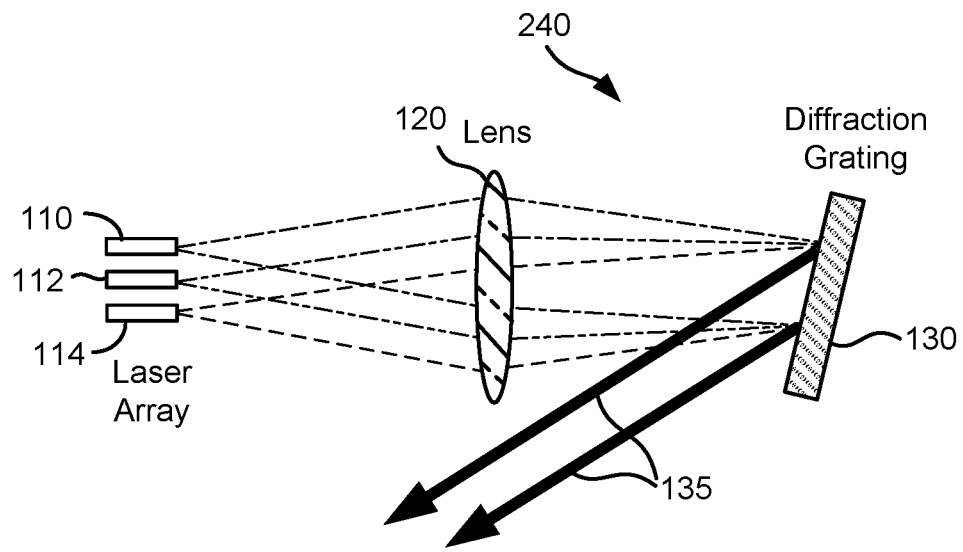
FIG. 1A is a simplified schematic diagram illustrating active spectral beam combination.
Figure 1B:
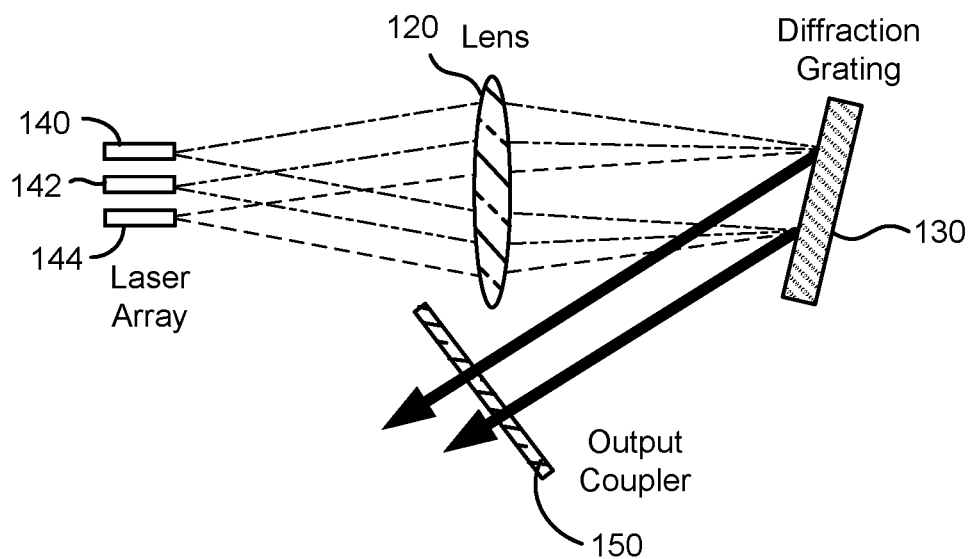
FIG. 1B is a simplified schematic diagram illustrating passive spectral beam combination.

The second primary method to combine lasers is spectral beam combination (SBC). In this method, the individual lasers are not engineered to be coherent with each other. Rather, each laser operates at a different wavelength, which is stabilized, and they are combined via a diffraction grating, much like a conventional optical spectrometer operated in reverse. FIG. 1A is a simplified schematic diagram illustrating active spectral beam combination. FIG. 1B is a simplified schematic diagram illustrating passive spectral beam combination. In active SBC as illustrated in FIG. 1A, the wavelengths of the individual lasers 110, 112, and 114 are collimated by lens 120 such that they impinge on the diffraction grating 130 as a set of collimated beams incident at different angles. The individual lasers are actively stabilized in wavelength in order to diffract off of the diffraction grating at the same angle and to properly overlap the beams 135 diffracting from the diffraction grating 130 and provide a substantial increase in brightness over that of the individual laser elements in the array.

In passive SBC as illustrated in FIG. 1B, the grating 130 itself and the output coupler 150 form part of an external cavity for each individual gain elements 140, 142, and 144. In this way, only a specific wavelength will be able to complete a geometric round trip in the external cavity formed by each of the individual gain elements and the output coupler 150. Since the orientation of the output coupler to the grating is fixed, the output beams of each of the external-cavity lasers will be overlapped after the output coupler 150, providing a substantial increase in brightness over that produced if the individual gain elements were uncombined lasers.

In some implementations, the lens 120 can be a curved mirror that provides a folded cavity with a smaller footprint. Alternatively, multiple gratings can be used to add the beams together during the beam combination process. SBC is utilized herein to provide an output beam that is spatially coherent, but including many wavelengths and, therefore, spectrally broader than any of the individual lasers. As will be evident to one of skill in the art, the spectral breadth will typically be over a limited spectral band, for example, 40 nm in width. Thus, embodiments of the present invention provide high power, spatially coherent output over a relatively narrow spectral band. One of ordinary skill in the art would recognize many variations, modifications, and alternatives.

Although many successful laboratory demonstrations have been achieved, implementation of SBC in high-power, commercial-grade, laser systems has been marginal for at least two reasons. First, the entire system is preferably mechanically stabilized such that there is no effective movement between the various parts making up the SBC system. This constrains the transform optic (lens or curved mirror), the grating(s), and the output coupler (if used) to be actively monitored and controlled throughout the lifetime of the system. These additional monitoring and control systems significantly increase the cost and complexity of the SBC laser system and are not therefore desirable.

The second reason that SBC has not been successfully commercially implemented in high-power laser systems is the susceptibility of the transform optic, the grating(s), and the output coupler (if used) to optical damage due to environmental contamination. Dust, moisture, or other particulates that settle on the optics can be burned by the high-power laser beams, causing irreparable and ultimately catastrophic damage to the components. As such, current SBC systems are housed within environmentally sealed (e.g., purged) chambers that are maintained at cleanliness levels equivalent to modern day clean rooms. Not only does such a rigorous system impose significant costs to operate the system, but the large and heavy (e.g., metallic) chambers significantly add to the size, weight, and cost of the system, which is detrimental both in construction and implementation.

As described herein, embodiments of the present invention overcome the two primary shortcomings of current SBC systems. Embodiments of the present invention provide a monolithic SBC system using an immersion grating, which eliminates the need for mechanical stabilization. Additionally, some embodiments utilize an immersion diffraction grating such that the grating surface itself can be directly isolated from the environment without affecting the incident optical beams.

Figure 2:
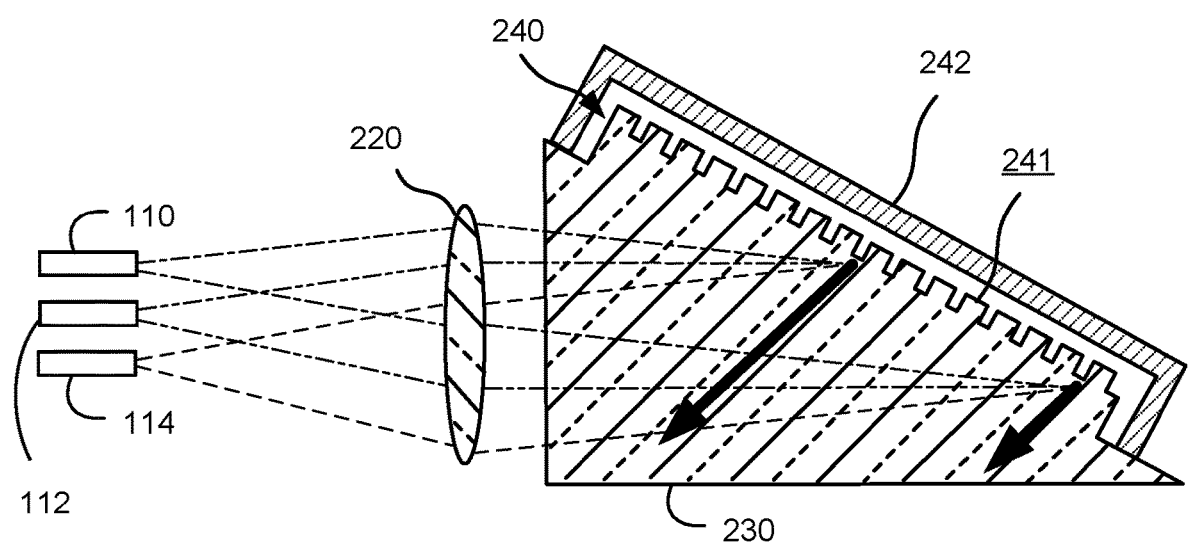
FIG. 2 is a simplified schematic diagram illustrating a multispectral beam combiner including an immersion grating prism according to an embodiment of the present invention.

FIG. 2 is a simplified schematic diagram illustrating a multispectral beam combiner including an immersion grating prism according to an embodiment of the present invention. As described more fully herein, the immersion grating prism 230 is referred to as an immersion grating prism since the light impinging on the grating 240 is propagating in the high index material of the prism before and after impingement on the grating. This contrasts with conventional grating technology in which the impingement surface of the grating is bounded by air or other gases.

In order to protect the grating 240, a protective cap 242 is positioned over the grating. Referring to FIG. 2, the prism with an immersion grating on one surface (immersion grating prism 230) includes an immersion grating 240 that can be attached to or fabricated directly on a surface of the prism, and a protective cap 242, which can also be referred to as a cover, is positioned over the grating and sealed to the prism. In some embodiments, the protective cap 242 is fabricated from a separate substrate and optically bonded to the surface of the prism. It should be noted that while FIG. 2 illustrates an embodiment utilizing a right-angle prism, the present invention is not limited to this type of prism and other shape prisms are included within the scope of the present invention. The immersion grating can be attached to the surface of the prism using a number of optical techniques, including being optically bonded, epoxied, fused, laser welded, or the like.

Referring to FIG. 2, the immersion grating prism and the protective cap results in protection of the grating surface from contaminants, which solves significant problems presented by conventional techniques. Since the light from the laser sources is incident on the grating from within the prism and the grating can be designed such that little to no light escapes the prism via the grating surface, the protective cap 242 can be placed over, but not in contact with, the grating surface 241. In this way, the grating surface 241 is permanently protected against the environment and any contaminants. As a further improvement, the protective cap 242 can be fabricated using a material with a similar coefficient of thermal expansion as the prism, preventing degradation of the bond between the protective cap and the prism over long periods of time. In some implementations, the protective cap is fabricated using the same material, for example, glass, that is used to fabricate the prism.

Figure 3A:
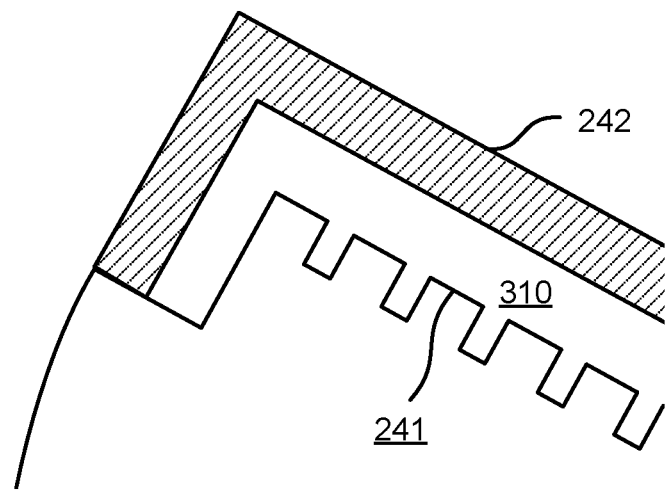
FIG. 3A is a simplified schematic diagram illustrating elements of the immersion grating prism illustrated in FIG. 2 according to an embodiment of the present invention.
Figure 3B:
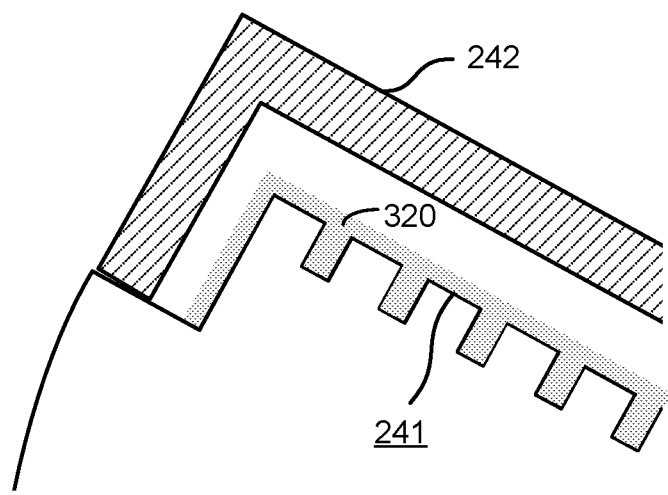
FIG. 3B is a simplified schematic diagram illustrating elements of the immersion grating prism illustrated in FIG. 2 according to another embodiment of the present invention.

FIG. 3A is a simplified schematic diagram illustrating elements of the immersion grating prism illustrated in FIG. 2 according to an embodiment of the present invention. FIG. 3B is a simplified schematic diagram illustrating elements of the immersion grating prism illustrated in FIG. 2 according to another embodiment of the present invention.

As illustrated in FIG. 3A, some embodiments of the present invention can utilize gratings that are uncoated. The grating 240 has grating surface 241 that is exposed to the environment 310 that is present between the grating and the protective cap. In some embodiments, the environment 310 is air, an inert gas, or other suitable gaseous environments. In these embodiments, the design of the immersion grating based on the grating equation is such that the transmitted orders are prohibited by Snell's law, resulting in only reflected orders forming the diffracted orders, which are directed inside the prism, with 100% reflectivity, similar to the effect of total internal reflection (TIR). Thus, even with an air interface to the immersion grating, high reflectivity can be achieved.

FIG. 3B illustrates an embodiment in which a metal layer 320 has been deposited on the surface 241 of the grating. In this embodiment, the metal layer, which may be a composite layer of different metal sub-layers, coats the surface of the grating and provides protection from particulates and the like. In some implementations, additional layers, including adhesion layers, dielectric layers, combinations thereof, and the like, are integrated with the metal layer 320. One of ordinary skill in the art would recognize many variations, modifications, and alternatives.

Figure 4:
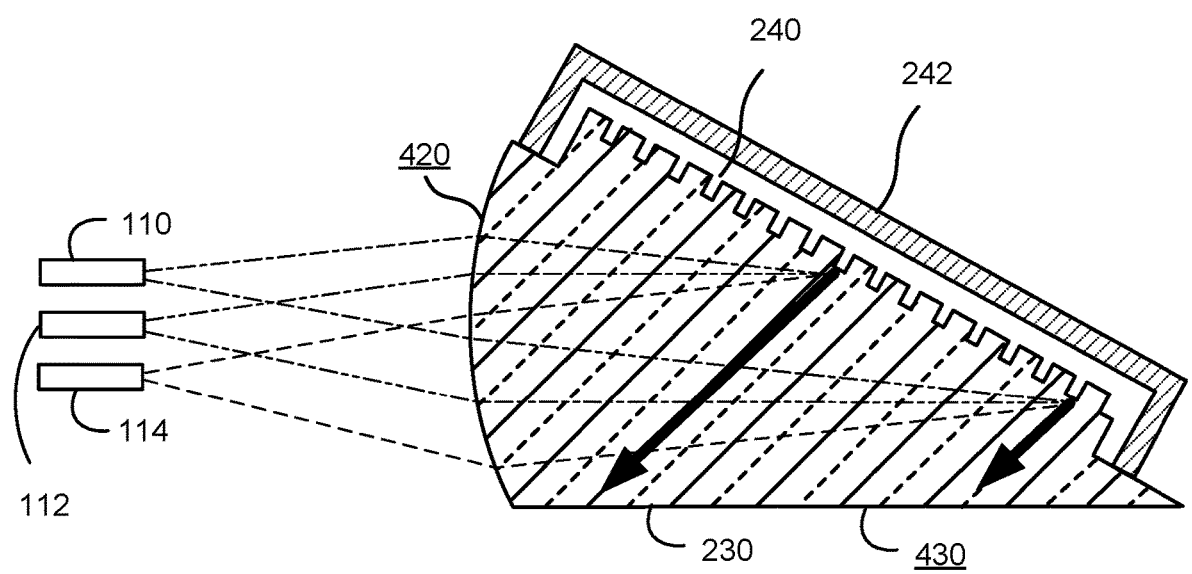
FIG. 4 is a simplified schematic diagram illustrating a multispectral beam combiner including a shaped grating immersion prism according to an embodiment of the present invention.

FIG. 4 is a simplified schematic diagram illustrating a multispectral beam combiner including a shaped grating immersion prism according to an embodiment of the present invention. Referring to FIG. 4, the input surface 420 of the immersion grating prism has been modified from the flat surface illustrated in FIG. 2 to a curved surface. The input surface collimates the beams from the individual sources such that they impinge on the immersion grating as substantially collimated beams. In the embodiment illustrated in FIG. 4, the light emitted by individual lasers 110, 112, and 114 is at different wavelengths. Accordingly, refraction at the input surface 420 as a function of wavelength results in the individual beams being collimated as they impinge on the grating, with each collimated beam for each wavelength incident at different angles. The collimation and differing angles enables the output beams to be both collimated and collinear.

Although a single curvature is illustrated in FIG. 3, it will be evident to one of skill in the art that a differing curvature could be used in the direction normal to the figure, enabling use of sources that are characterized by differing divergences in differing directions, which is typical of semiconductor laser sources.

Shaping of the input surface 420 of the immersion grating prism creates a focusing element such that the transform lens and the immersion grating prism are combined into a single monolithic element including the focusing element. Accordingly, requirements for stabilization between components are relaxed, improving system performance and reliability. Although not illustrated in FIG. 4, the output surface 430 can be shaped as well and designed to either serve as the output coupler of a passive SBC system or a collimation and/or imaging element of an active SBC system.

It should be noted that the exit angle of the light off the grating is represented only for purposes of illustration. The combined exit beam need not exit the immersion grating prism through a different surface than the input beams entered on.

Figure 5:
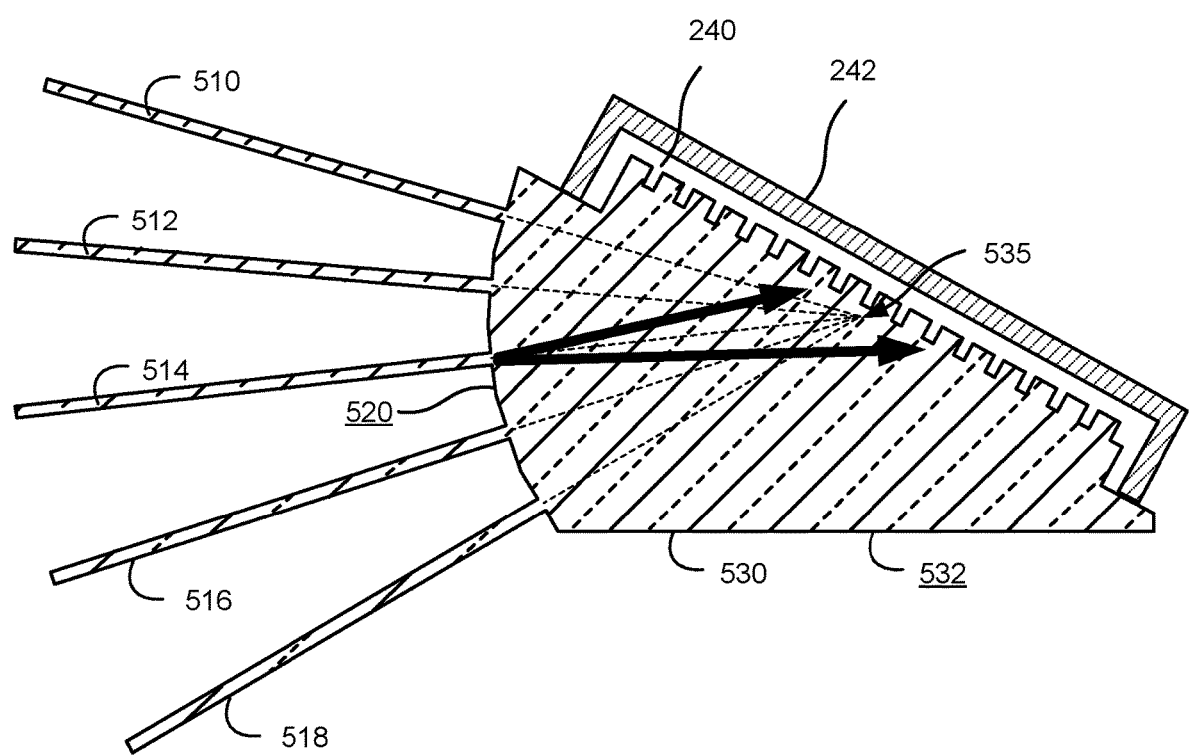
FIG. 5 is a simplified schematic diagram illustrating a monolithic multispectral beam combiner including optical fiber inputs and a grating immersion prism according to an embodiment of the present invention.

FIG. 5 is a simplified schematic diagram illustrating a monolithic multispectral beam combiner including optical fiber inputs and a grating immersion prism according to an embodiment of the present invention. The system illustrated in FIG. 5 can be referred to as an SBC system. Referring to FIG. 5, optical fibers 510, 512, 514, 516, and 518 are used to transport the input optical beams from the input sources, which can be either laser sources or optical gain elements. The optical fibers are attached, for example, optically bonded, fused, or welded (e.g., laser welded) onto the input surface 520 of the immersion grating prism 530. The optical fibers can be attached to the input surface using a number of optical techniques, including being optically bonded, epoxied, fused, laser welded, or the like.

Although five optical fibers are illustrated in FIG. 5, embodiments of the present invention are not limited to this particular number and other numbers of fibers, more or less than five, can be utilized in various embodiments. In some embodiments, over 100 optical fibers are utilized. The monolithic attachment of the fibers to the immersion grating prism as illustrated in FIG. 5 provides reliability and alignment accuracy not provided by some other approaches. Additionally, the grating protection provided by the protective cap, as discussed in relation to FIG. 2, provides high reliability. One of ordinary skill in the art would recognize many variations, modifications, and alternatives.

The input surface 520 can be shaped such that the propagation axis of each optical fiber carrying the input optical beams is aligned to a single location 535 on the grating such that the beams exiting from each optical fiber overlap on the grating. Accordingly, in some embodiments, the optical fibers are radially aligned such that beams propagating along the axis of each of the fibers impinge on the grating at location 535. In some instances, location 535 is positioned at the center of the grating, but this is not required by the present invention. It should be noted that in addition to radial alignment, the input surface 520 is shaped such that each of the input beams propagate from the input surface 520 to location 535 such that the beams have the same size when they reach location 535. In some embodiments, the surface is curved. In other embodiments, the surface includes a series of flat surfaces that approximate a continuous curve. One of ordinary skill in the art would recognize many variations, modifications, and alternatives.

The multispectral beam combiner illustrated in FIG. 5 is completely monolithic and requires no mechanical stabilization. This embodiment is particularly useful when the laser elements being combined are fiber lasers. The output of such fiber lasers (not shown) can be fusion spliced onto the optical fibers 510-518 of the monolithic immersion grating prism, and the entire SBC laser system can, therefore, be monolithic, with the entire system, from the fiber lasers to the output, being only glass or other suitable material. Although not illustrated in FIG. 5, the surface shape of output surface 532 can be shaped as well and designed to either provide feedback into the optical fibers for a passive SBC system or a collimation and/or imaging element of an active SBC system. In the passive SBC system, the optical fibers could be fiber amplifiers, gain elements, or lead fibers coupled to either. Thus, embodiments using both fiber lasers and fiber amplifiers are included within the scope of the invention. One of ordinary skill in the art would recognize many variations, modifications, and alternatives.

Although not illustrated in FIG. 5, various alternative designs can be based on the system illustrated in FIG. 5, including the illustrated case in which a diverging beam exits the output surface 532 of the prism, the case in which the output surface 532 is curved to collimate the output beam of the system, which would be suitable for use with fiber lasers, and the case in which the output surface 532 is curved and partially reflective to serve as an output coupler and reflect the output beam back towards the optical fibers, which would be fiber amplifiers or fibers coupled to gain elements.

Figure 6A:
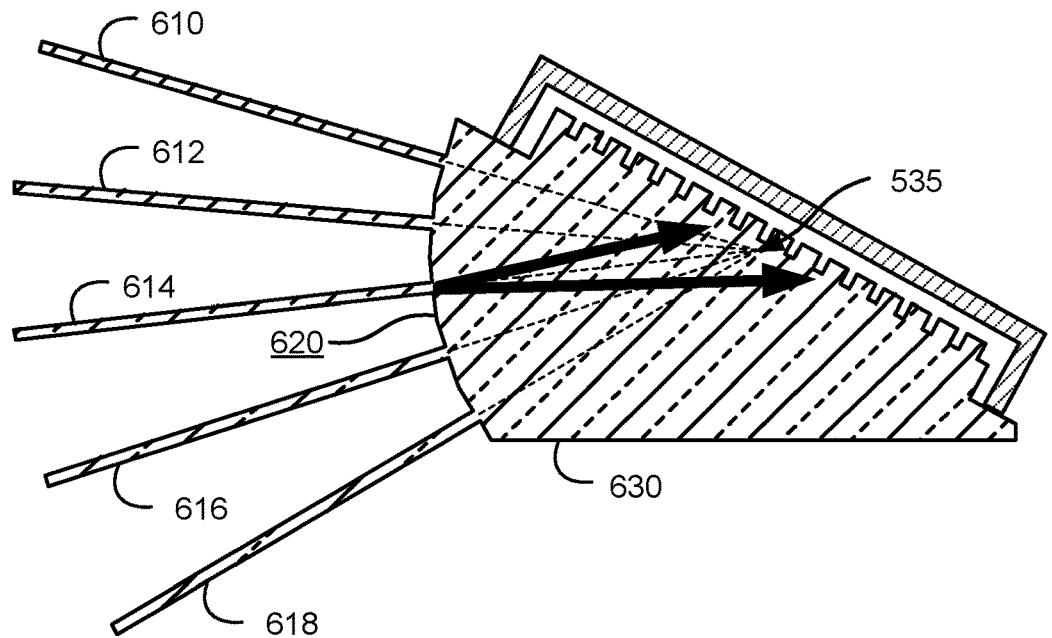
FIGS. 6A-6C are simplified schematic diagrams illustrating a monolithic multispectral beam combiner including optical fiber inputs, outputs that are separated from the inputs, and a grating immersion prism according to an embodiment of the present invention.
Figure 6B:
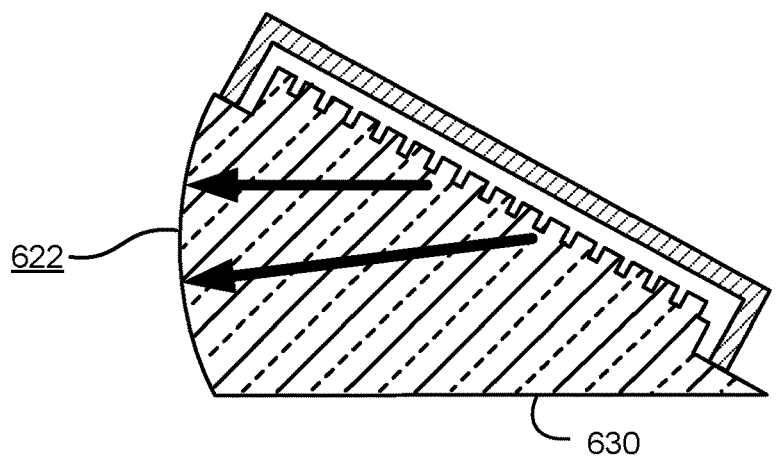
Figure 6C:
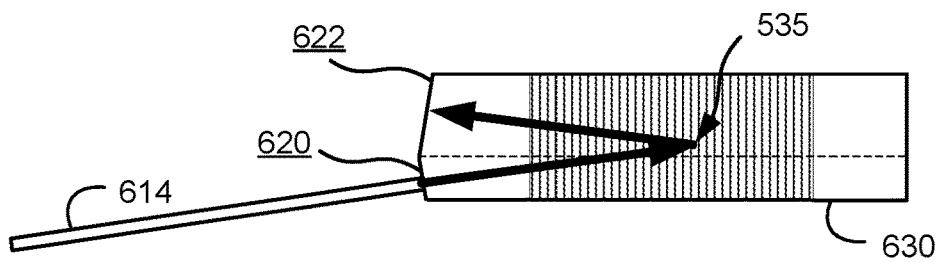

FIGS. 6A-6C are simplified schematic diagrams illustrating a monolithic multispectral beam combiner including optical fiber inputs, outputs that are separated from the inputs, and a grating immersion prism according to an embodiment of the present invention. As discussed below, the input surface 620, to which the optical fibers 610-618 are attached, is angled in the direction perpendicular to the plane containing the fibers.

FIG. 6A is a simplified schematic plan view of a bottom portion of the monolithic multispectral beam combiner. FIG. 6B is a simplified schematic plan view of a top portion of the monolithic multispectral beam combiner. FIG. 6C is a simplified schematic side view of the monolithic multispectral beam combiner. The view illustrated in FIG. 6A is similar to that illustrated in FIG. 5, showing the optical fibers 610-618 carrying the input optical beams, which propagate towards a common point 635 on the grating surface.

FIG. 6B illustrates how the beam input from optical fiber 614 diffracts off of the grating and exits the prism 630. FIG. 6C illustrates both input beams and output beams in the side view of the system. The angling of the input surface allows for the separation of the incoming beams (i.e., input beams from the optical fibers) from the outgoing beam (i.e., the combined beam), as illustrated in FIG. 6C. The output surface can be shaped and designed to either provide feedback into the optical fibers for a passive SBC system or a collimation and/or imaging element of an active SBC system. Thus, surface 622 can be curved to collimate the diffracted light, for example, when used in conjunction with fiber lasers. Alternatively, surface 622 can be curved and partially reflective to reflect diffracted light back towards the fibers 610-618, for example, when used in conjunction with fiber amplifiers.

Referring to FIGS. 6A-6C, the monolithic multispectral beam combiner including optical fiber inputs and orthogonally separated outputs is particularly useful when the grating is designed to operate near a Littrow configuration. In this configuration, input light strikes the grating at an upward angle such that diffracted light propagates in an upward direction after diffraction from the grating. Thus, diffracted light propagates back in the direction towards the input fibers, but displaced in the vertical direction, providing a mechanism so that the output beams are present on a different surface from the input surface. In the side view illustrated in FIG. 6C, the multiple fibers illustrated in FIG. 6A are arrayed in the direction normal to the plane of FIG. 6C.

Surface 620 in FIGS. 6A and 6C is preferably perpendicular to the direction of propagation of light in the fibers and the direction of light propagation between surface 620 and the grating. Because the diffracted beam is diverging, toward surface 622 illustrated in FIGS. 6B and 6C, the diffracted beam can be perpendicular to surface 622 or oriented at a non-normal angle with respect to surface 622.

In alternative embodiments, the generally orthogonal (for curved surfaces, the beams may not be completely normal to the surface) separation of incoming and outgoing beams illustrated in FIGS. 6A-6C can be applied to the input surfaces illustrated and discussed in relation to FIGS. 3 and 4 in which optical fiber inputs were not utilized. One of ordinary skill in the art would recognize many variations, modifications, and alternatives.

Referring once again to FIG. 6C, the arrow from surface 620 toward location 535 is illustrated as pointing toward location 535 and the arrow from surface 535 toward location 622 is illustrated as pointing toward location 622. These one-way arrows are applicable in configurations in which diffracted light passes through surface 622 without substantial reflection. In this configuration, surface 622 could be non-normal to the direction of propagation and/or AR coated for the diffracted light to reduce reflections propagating back towards the fibers 610-618. In external cavity applications, for example, passive spectral beam combination, in which diffracted light reflects off of surface 622 and is coupled back into fibers 610-618, the arrows could also point both directions, one double-ended arrow between location 535 and surface 622, and one double-ended arrow between surface 620 and location 535, to illustrate diffracted light in this return path toward the gain media.

Figure 7:
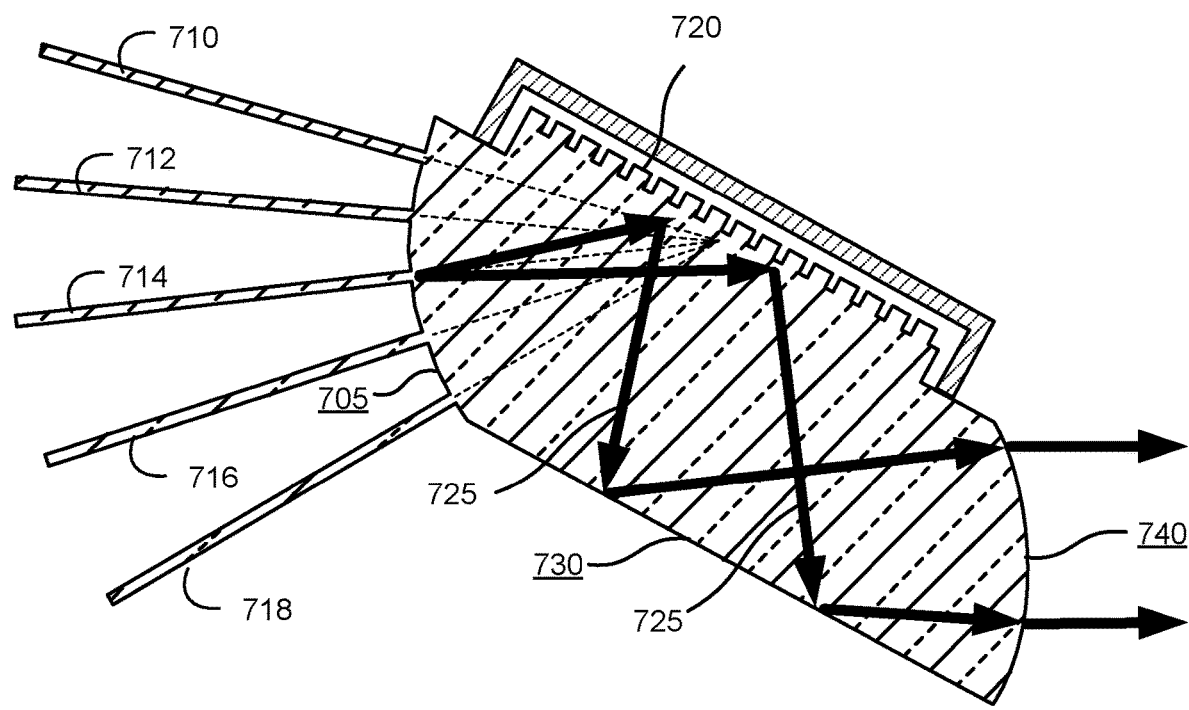
FIG. 7 is a simplified schematic diagram illustrating a monolithic multispectral beam combiner including a grating immersion prism with internal reflection according to an embodiment of the present invention.

FIG. 7 is a simplified schematic diagram illustrating a monolithic multispectral beam combiner including a grating immersion prism with internal reflection according to an embodiment of the present invention. In FIG. 7, light from inputs fibers 710-718 diffracts off of immersion grating 720. In some implementations, the immersion grating 720 can be fabricated as a metal grating, but this is not required by the present invention. The grating dispersion is sufficient to generate a diffracted order 725 that propagates toward surface 730. At surface 730, total internal reflection can occur for diffracted order 725, resulting in reflection toward output surface 740. In another embodiment, surface 730 is coated with a high reflectivity coating, such as a multi-layer dielectric stack, a metal, or the like. Thus, the grating provides sufficient separation between incoming and outgoing beams that the outgoing beam can be redirected with a surface of the prism that is different than the incoming surface towards an output surface.

Having a reflective surface 730 that is substantially parallel to the grating surface (as shown in FIG. 7) is not necessary, but has advantages in some implementations for optically bonding the immersion grating to the prism surface. The output surface 740 can be shaped for reflection back into the laser cavity, or for collimation (as illustrated in FIG. 7) or other imaging functions. As alternatives to the geometry illustrated in FIG. 7, the fiber inputs connected to input surface 705 can be removed, providing a geometry similar to the geometries illustrated in FIGS. 2 and 4.

Additionally, the output surface can be curved to collimate the output beam of the system, which would be suitable for use with fiber lasers or curved and partially reflective to serve as an output coupler and reflect the output beam back towards the optical fibers, which would be fiber amplifiers or fibers coupled to gain elements. One of ordinary skill in the art would recognize many variations, modifications, and alternatives.

Figure 8:
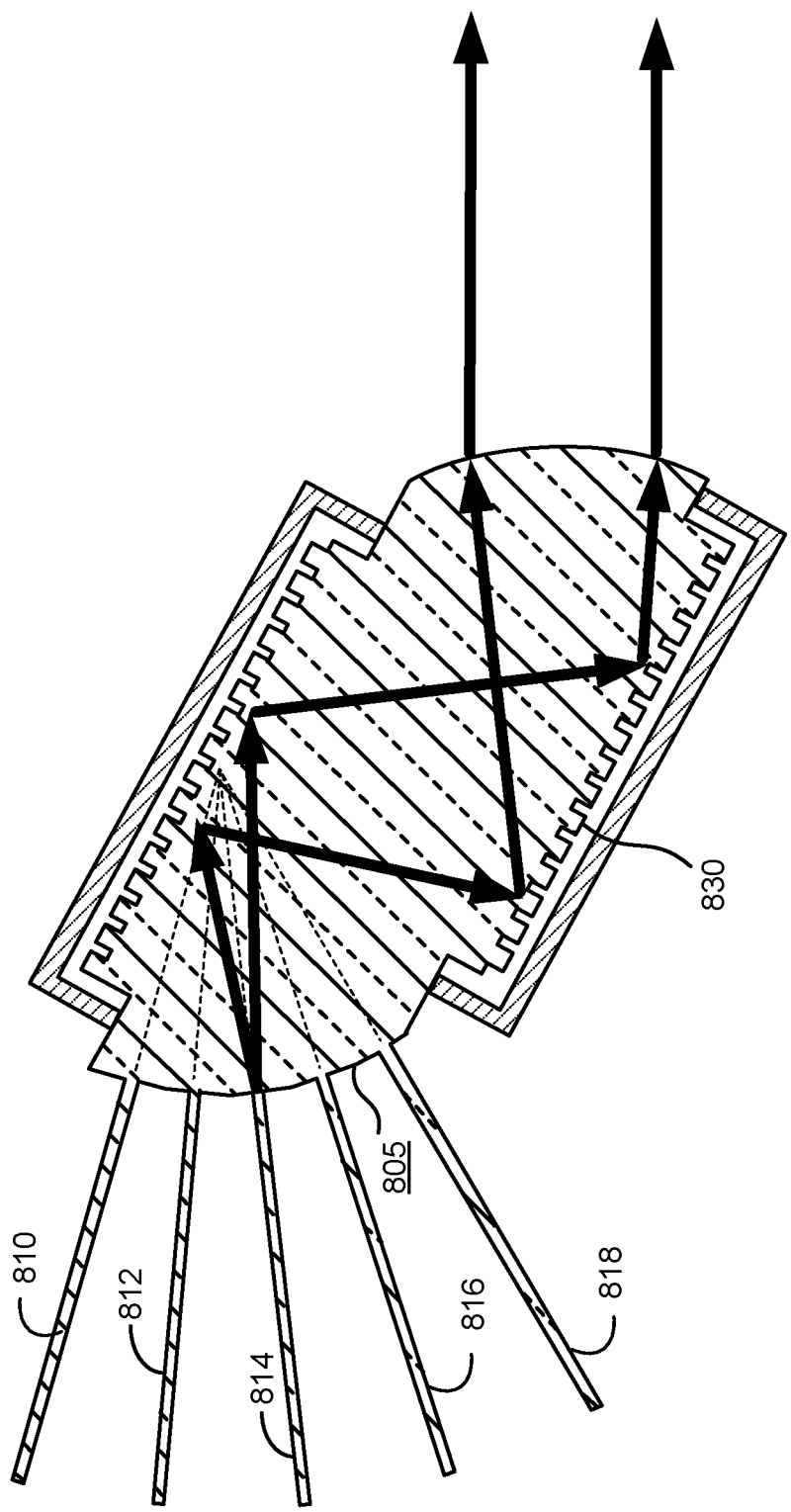
FIG. 8 is a simplified schematic diagram illustrating a monolithic multispectral beam combiner including a dual sided grating immersion prism according to an embodiment of the present invention.

FIG. 8 is a simplified schematic diagram illustrating a monolithic multispectral beam combiner including a dual sided grating immersion prism according to an embodiment of the present invention. As illustrated in FIG. 8, the reflective surface 730 illustrated in FIG. 7 to separate the output beam has been replaced with a second immersion grating 830. Use of dual immersion gratings can allow additional degrees of freedom in the design of the grating prism. The second immersion grating 830 does not need to be parallel to the first immersion grating (as is illustrated in FIG. 8). The output surface 840 can be shaped for reflection back into the laser cavity, or for collimation (as shown in FIG. 8) or other imaging functions. As alternatives to the geometry illustrated in FIG. 8, the fiber inputs 810-818 connected to input surface 805 can be removed, providing a geometry similar to the geometries illustrated in FIGS. 2 and 4.

It will be noted that all of the configurations disclosed herein can utilize immersion gratings that include a total internal reflection (TIR) grating. A TIR grating is a grating whose transmitted diffracted orders are inherently and completely prevented via total internal reflection (TIR). A TIR grating works only in reflection such that no transmitted orders are produced. This simplifies the fabrication process for the grating prism in several ways. First, most gratings are coated with thin layers of metal or other materials to provide reflection. This additional processing step can be completely eliminated with the use of TIR gratings, saving manufacturing costs. Second, with the reflective layers eliminated, the high-power laser beams only interact with a singular dielectric material rather than with absorbing material such as metal or intensity-enhancing dielectric-stacks. Therefore, the TIR grating prism is more impervious to damage from high-power optical beams, which is beneficial for spectral beam combining applications.

Also, it should be noted that the optical surfaces described herein and illustrated in the figures can be coated to enhance or suppress reflections, depending on the application. As an example, the input optical surfaces can be coated with an anti-reflection coating to minimize reflections and lost power. The output surface in an active SBC system can be coated with an anti-reflection coating to minimize reflections and lost power. The output surface in a passive SBC system can be coated with a partially-reflective coating as appropriate for efficient laser element operation. Any reflecting non-grating surfaces can be high reflection coated to provide high efficiency (nearly lossless) reflection.

Figure 9A:
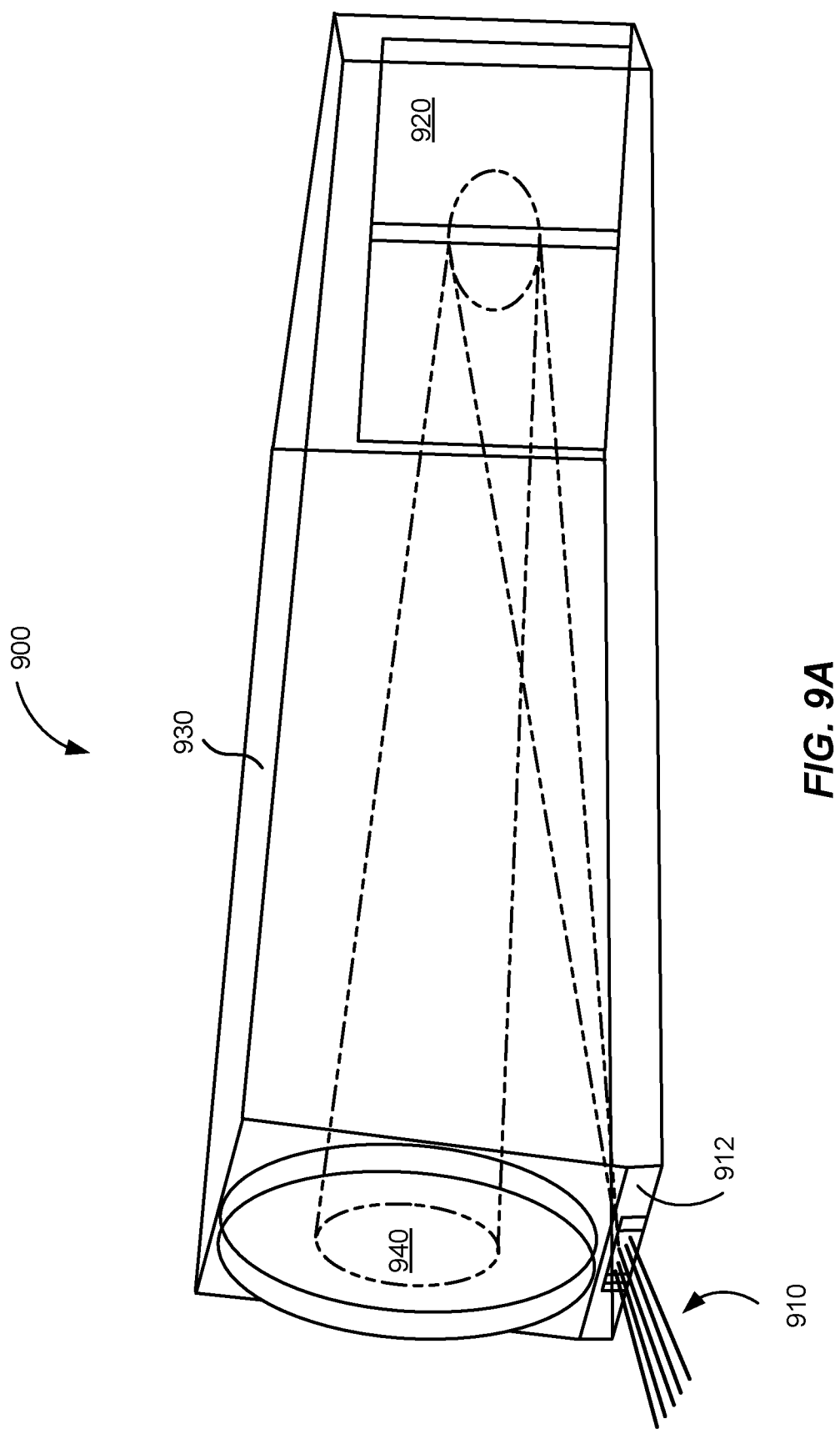
FIG. 9A is a simplified perspective view illustrating a monolithic multispectral beam combiner including optical fiber inputs and a grating immersion prism according to another embodiment of the present invention.

FIG. 9A is a simplified perspective view illustrating a monolithic multispectral beam combiner including optical fiber inputs and a grating immersion prism according to another embodiment of the present invention. As illustrated in FIG. 9A, a plurality of input fibers 910, each carrying a different wavelength, are attached to an input surface 912 of the monolithic multispectral beam combiner 900, also referred to as a beam combiner. The input fibers can be attached to the input surface using a number of optical techniques, including being optically bonded, epoxied, fused, laser welded, or the like. Thus, the use of the term bonded as used herein should be understood to include methods for optical attachment. One of ordinary skill in the art would recognize many variations, modifications, and alternatives.

Light from each of the input fibers propagates to an immersion grating 920 that shares similar features with the immersion grating illustrated in FIG. 2. After diffraction from the immersion grating, the beams of each wavelength propagate through the body 930 of the beam combiner and exit the beam combiner at an output surface 940. In this embodiment, the beams at the various wavelengths are diverging as they propagate from the input surface to the immersion grating and from the immersion grating to the output surface.

Figure 9B:
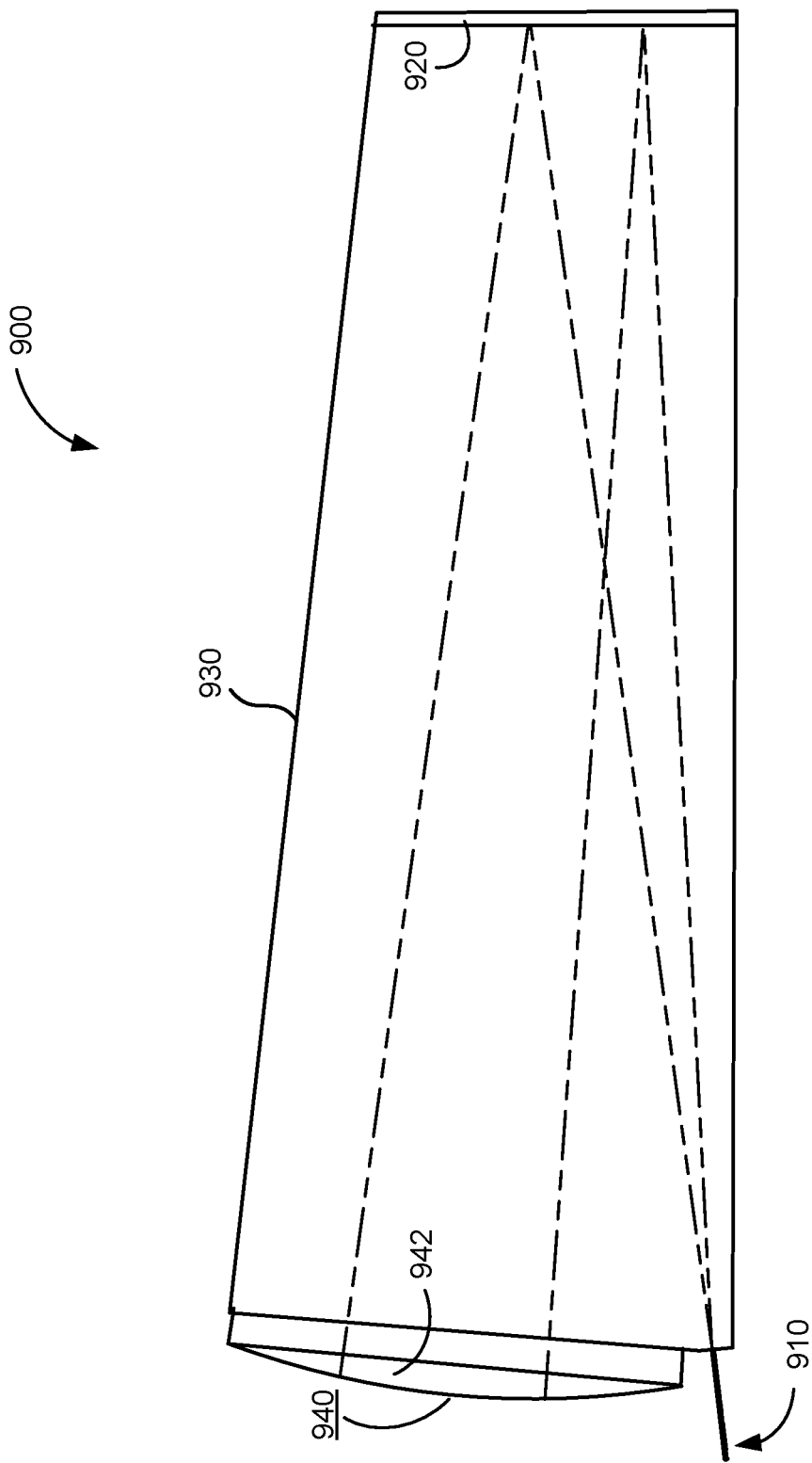
FIG. 9B is a simplified side view illustrating the monolithic multispectral beam combiner illustrated in FIG. 9A.

FIG. 9B is a simplified side view illustrating the monolithic multispectral beam combiner 900 illustrated in FIG. 9A. In this side view, the diverging beams from the input fibers 910, which are aligned along a line perpendicular to the plane of the figure, are illustrated as they propagate through the body 930 of the beam combiner to the immersion grating 920 and as they propagate in a substantially opposite direction to the output surface 940. In this embodiment, the output surface 940 includes a lensing element 942 that can collimate the beam upon exit.

Figure 9C:
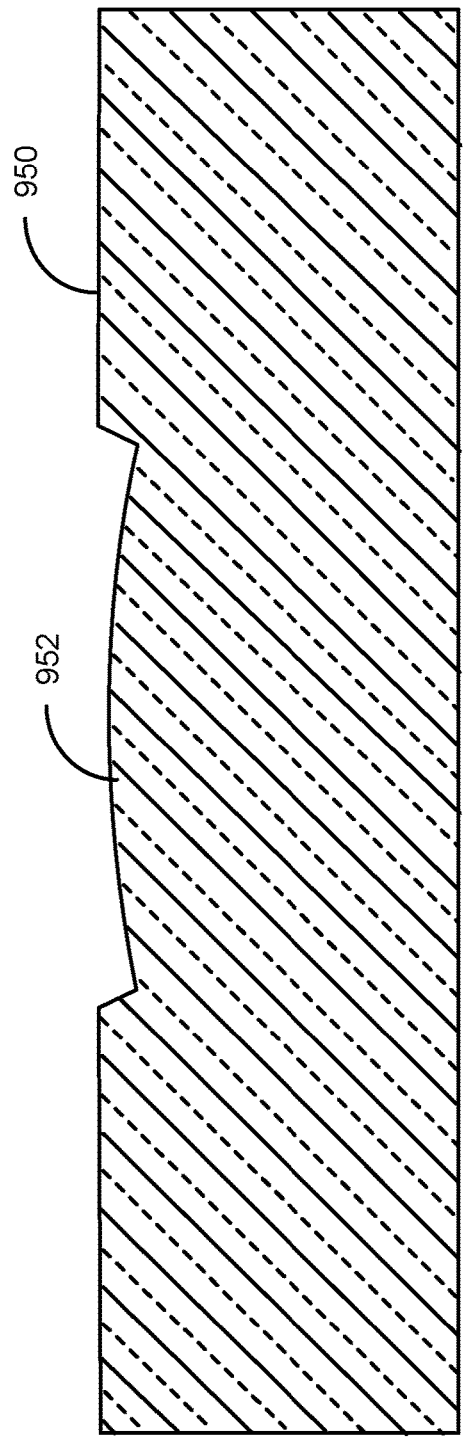
FIG. 9C is a simplified side view of the input surface of the monolithic multispectral beam combiner illustrated in FIG. 9A.

FIG. 9C is a simplified side view of the input surface of the monolithic multispectral beam combiner illustrated in FIG. 9A. Referring to FIG. 9C, the input surface 950 of the beam combiner, which can also be referred to as an input face, includes a curved input coupler 952, for example, a milled-out curved surface, to which the input fibers 910 are attached, for example, bonded, fused, or laser welded. The curved input coupler 952 comprises a convex surface and is recessed into the beam combiner in this embodiment. The curvature of the curved input coupler is selected such that the light from the various input fibers that are attached to the curved input coupler propagates toward the immersion grating after passing through the curved input coupler. As an example, the input fibers can be attached at angles that are normal to the curved input surface so that the light passing through the curved input coupler propagates along radial lines, with the center of curvature of the curved input surface aligned with the plane of the diffraction grating. As the beams of different wavelengths impinge on the immersion grating at different angles of incidence, they are diffracted at the same angle, providing for collinear beams after diffraction.

Figure 9D:
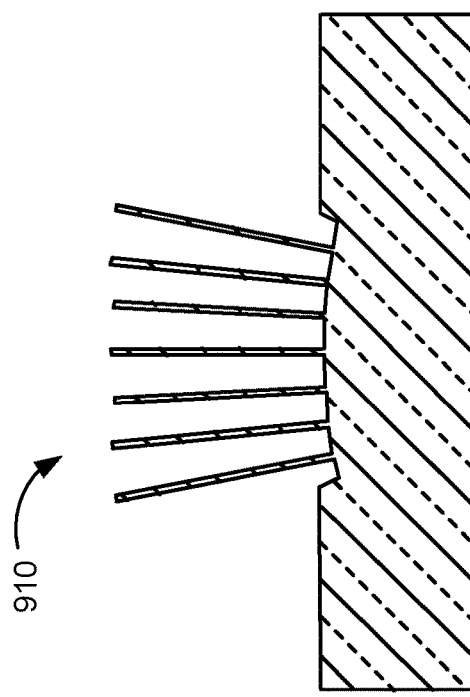
FIG. 9D is another simplified side view of the input surface of the monolithic multispectral beam combiner with attached input fibers according to an embodiment of the present invention.

FIG. 9D is another simplified side view of the input surface of the monolithic multispectral beam combiner with attached input fibers according to an embodiment of the present invention. In the illustrated embodiment, the input fibers 910 are laser welded to the curved input coupler 952. The radial arrangement of the input fibers (fibers are aligned with radial lines with the center of curvature aligned with the immersion grating) enables propagation toward the immersion grating at different angles for each wavelength and subsequent collinear output beams as discussed above.

Referring to FIGS. 6A through 6C, alternative monolithic multispectral beam combiner structures that include optical fiber inputs, outputs that are separated from the inputs, and a grating immersion prism are provided by the embodiments illustrated in FIGS. 9A-9C, FIGS. 10A-10C, and FIGS. 11A-11C, and FIGS. 12A-12D.

Figure 10A:
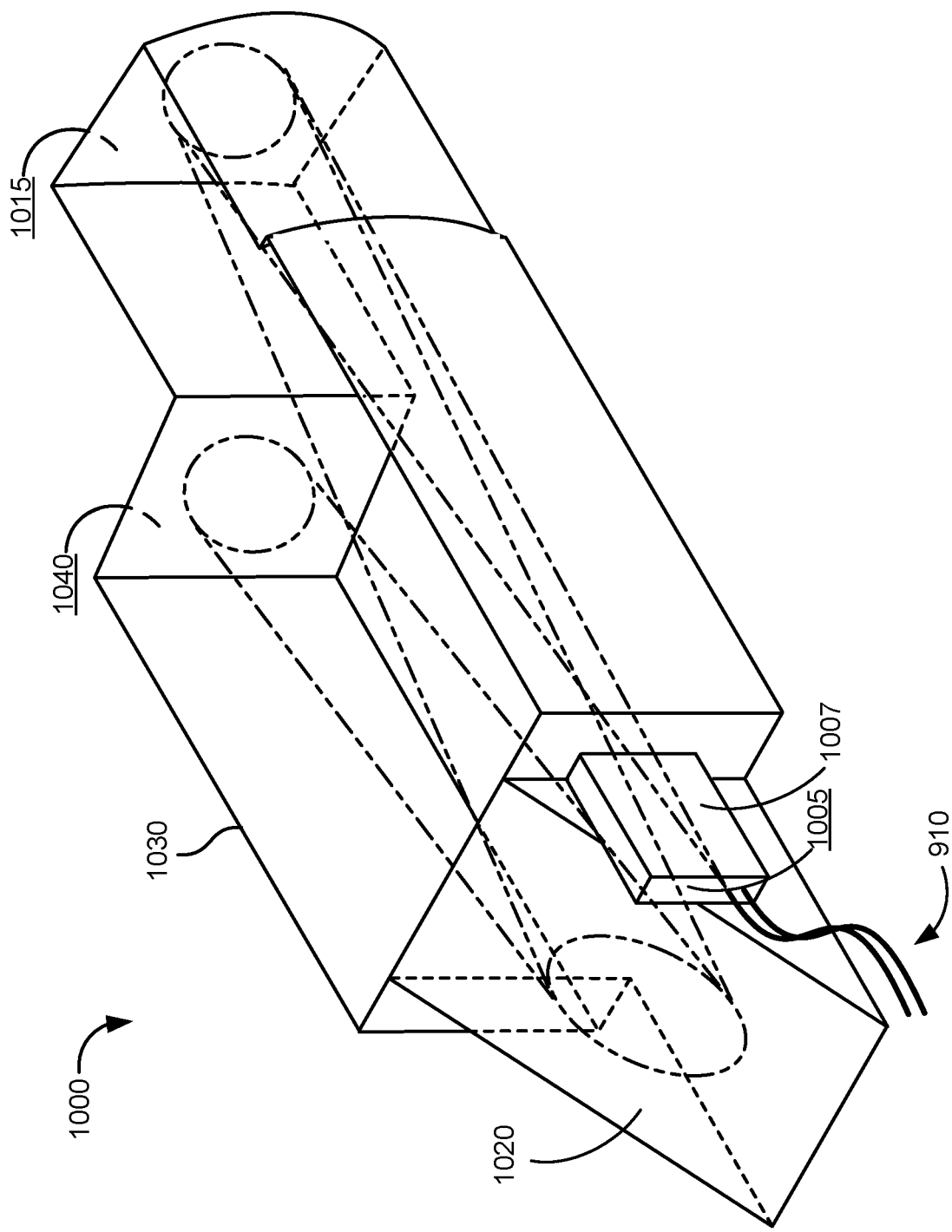
FIG. 10A is a simplified perspective view of the monolithic multispectral beam combiner according to an alternative embodiment of the present invention.

FIG. 10A is a simplified perspective view of the monolithic multispectral beam combiner according to an alternative embodiment of the present invention. The monolithic multispectral beam combiner 1000, also referred to as a beam combiner, includes an input port 1007 including an input surface 1005 to which a plurality of fibers are attached, for example, bonded, fused, or laser welded. The input fibers 910 (illustrated in FIGS. 10B and 10C) are coupled to the input surface 1005 such that the light from the fibers propagates directly toward the collimating surface 1015. In an embodiment, the input surface 1005 comprises a planar surface. After collimation as a result of reflection off of the collimating surface 1015, the collimated light beams propagate toward the diffraction grating 1020, which can share common elements with the grating 240 and protective cap 242 discussed in relation to FIG. 2. Although the protective cap is not illustrated in FIG. 10A, it will be appreciated that the description provided for the immersion grating in relation to FIG. 2 is applicable to the diffraction grating 1020 illustrated in FIG. 10A as appropriate. One of ordinary skill in the art would recognize many variations, modifications, and alternatives.

After diffraction off of the diffraction grating 1020, the light propagates through the body 1030 of the beam combiner and passes through output surface 1040. The collimating surface 1015 will typically be coated with a high reflectivity (HR) coating and the output surface 1040 will typically be coated with an antireflection (AR) coating.

Figure 10B:
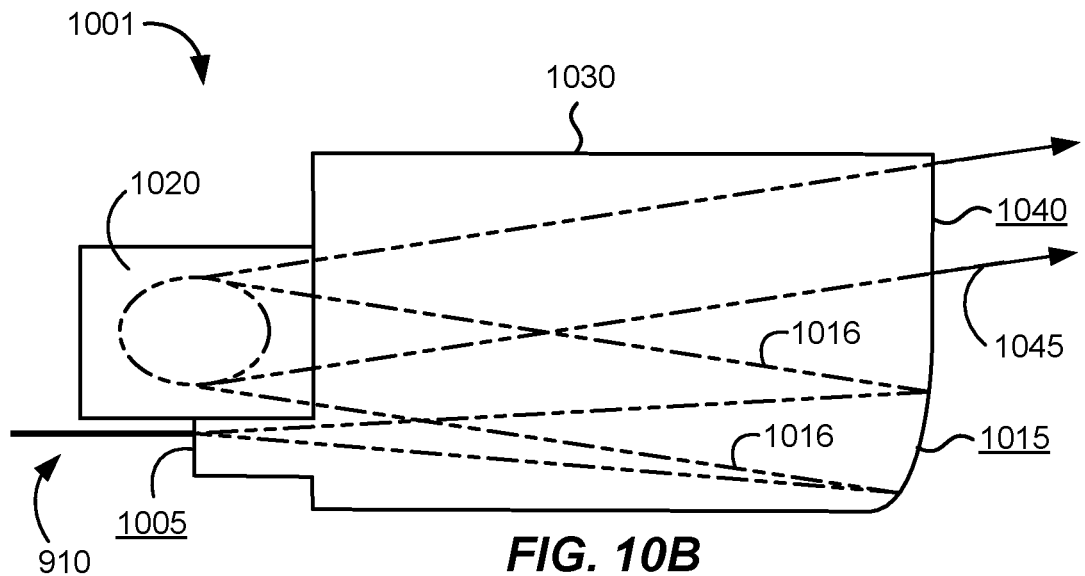
FIG. 10B is a simplified plan view of a monolithic multispectral beam combiner according to an embodiment of the present invention.

FIG. 10B is a simplified plan view of a monolithic multispectral beam combiner according to an embodiment of the present invention. As illustrated in FIG. 10B, the monolithic multispectral beam combiner 1001 includes an input surface 1005 to which a plurality of fibers 910 are attached, for example, optically bonded. In this view, the fibers are arrayed along a line perpendicular to the plane of the figure, that is, the plurality of fibers are stacked along a line extending into the plane of the figure. The light from the fibers propagates through the body 1030 of the beam combiner toward the collimating surface 1015, where the light is collimated and reflected toward the diffraction grating 1020. Because of the curvature of the collimating surface 1015, the light from the fibers, which was expanding as it propagated through the body, is collimated by reflection off of collimating surface 1015. Accordingly, collimated beams 1016 propagate toward the diffraction grating 1020. In some embodiments, the collimating surface 1015 is formed by grinding using optical techniques to provide a surface with a curvature that will collimate the diverging beams produced using the attached fibers.

After diffraction, the light propagates as a collimated beam toward output surface 1040 and passes through the output surface as a collimated output beam 1045. In some embodiments, output surface 1040 is AR coated.

Figure 10C:
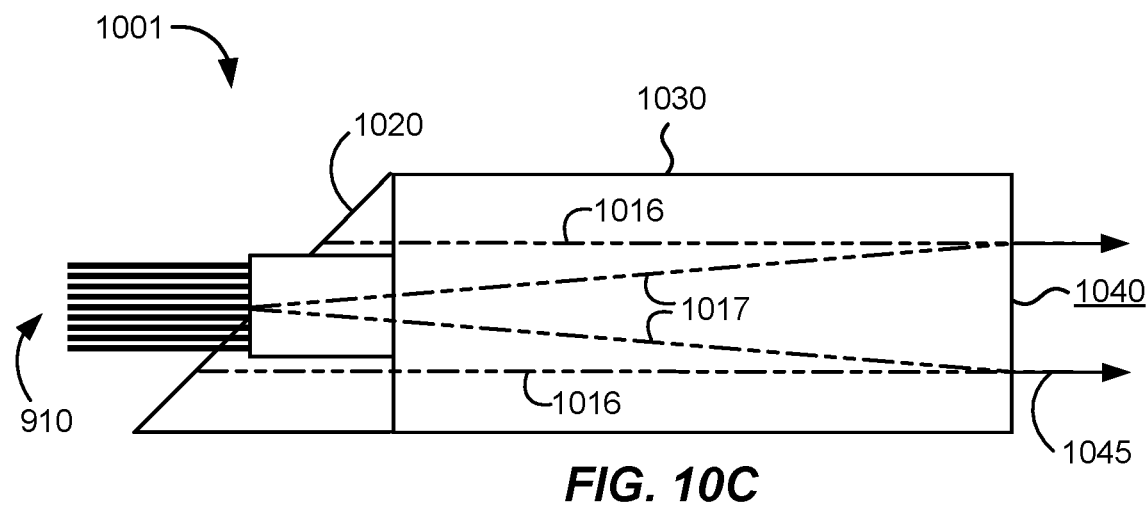
FIG. 10C is a simplified side view of the monolithic multispectral beam combiner illustrated in FIG. 10A.

FIG. 10C is a simplified side view of the monolithic multispectral beam combiner 1001 illustrated in FIG. 10B. As illustrated in the side view, the input fibers 910 are arrayed in a plane and attached, for example, optically bonded to the input surface. Divergence of light propagating through the body 1030 toward the collimating surface is represented by light rays 1017 and collimated light propagating from the diffraction grating toward the output surface is represented by light rays 1018.

Comparing FIGS. 10A and 10B/C, the output surface 1040 and the collimating surface 1015 are not aligned in FIG. 10A, but are substantially aligned in FIGS. 10B and 10C. Thus, differing embodiments are illustrated. In the embodiment illustrated in FIG. 10A, the spatial separation between the output surface and the collimating surface provide working distance for the fabrication of the different structures and for the application of coatings (e.g., AR and FIR) as appropriate. In the embodiment illustrated in FIGS. 10B and 10C, fabrication techniques can be utilized that are suitable for the substantially aligned geometry characterizing this embodiment.

Referring to FIG. 10C, because the input fibers include different wavelength beams, the collimating surface collimates the beams, which then travel to the grating at different angles. As discussed in relation to FIG. 4, the combination of collimation and differing angles of incidence on the grating results in an output that includes multiple wavelength beams that are both collimated and collinear.

Utilizing embodiments of the present invention as illustrated in FIGS. 10A-10C, good beam quality is produced at kilometer-scale distances by collimating the light that is incident on the grating. In addition to the reflective collimating surface 1015 illustrated in FIG. 10B, a transmissive collimating surface, such as surface 420 illustrated in FIG. 4, can be utilized in conjunction with the implementation shown in FIGS. 10A-10C. In this case, collimation at the input surface could be performed, with collimating surface 1015 replaced with a flat surface or a portion of the collimation could be performed at an the input surface and the remainder of the collimation could be performed at a reflective surface similar to collimating surface 1015 but with a different curvature. In some embodiments, a flat input surface is utilized in conjunction with the fibers being attached, for example, bonded, in a parallel configuration. In these embodiments, the spatial offset in the input plane translates to an angular offset in the beam after reflection from the collimating surface. One of ordinary skill in the art would recognize many variations, modifications, and alternatives.

Referring once again to FIG. 10A, an alternative embodiment would utilize an output block attached, for example, bonded, to the illustrated output surface. This output block could extend from the output surface to be substantially parallel with the collimating surface as shown. In yet another embodiment of the present invention, the material of the prism body could be machined to form the output surface from the prism body while the collimating surface is also machined from the prism body. This design would provide a substantially aligned output surface/collimating surface as illustrated in FIG. 10C. Thus, various embodiments can utilize differing geometries to achieve the same or similar optical performance. One of ordinary skill in the art would recognize many variations, modifications, and alternatives.

Figure 11A:
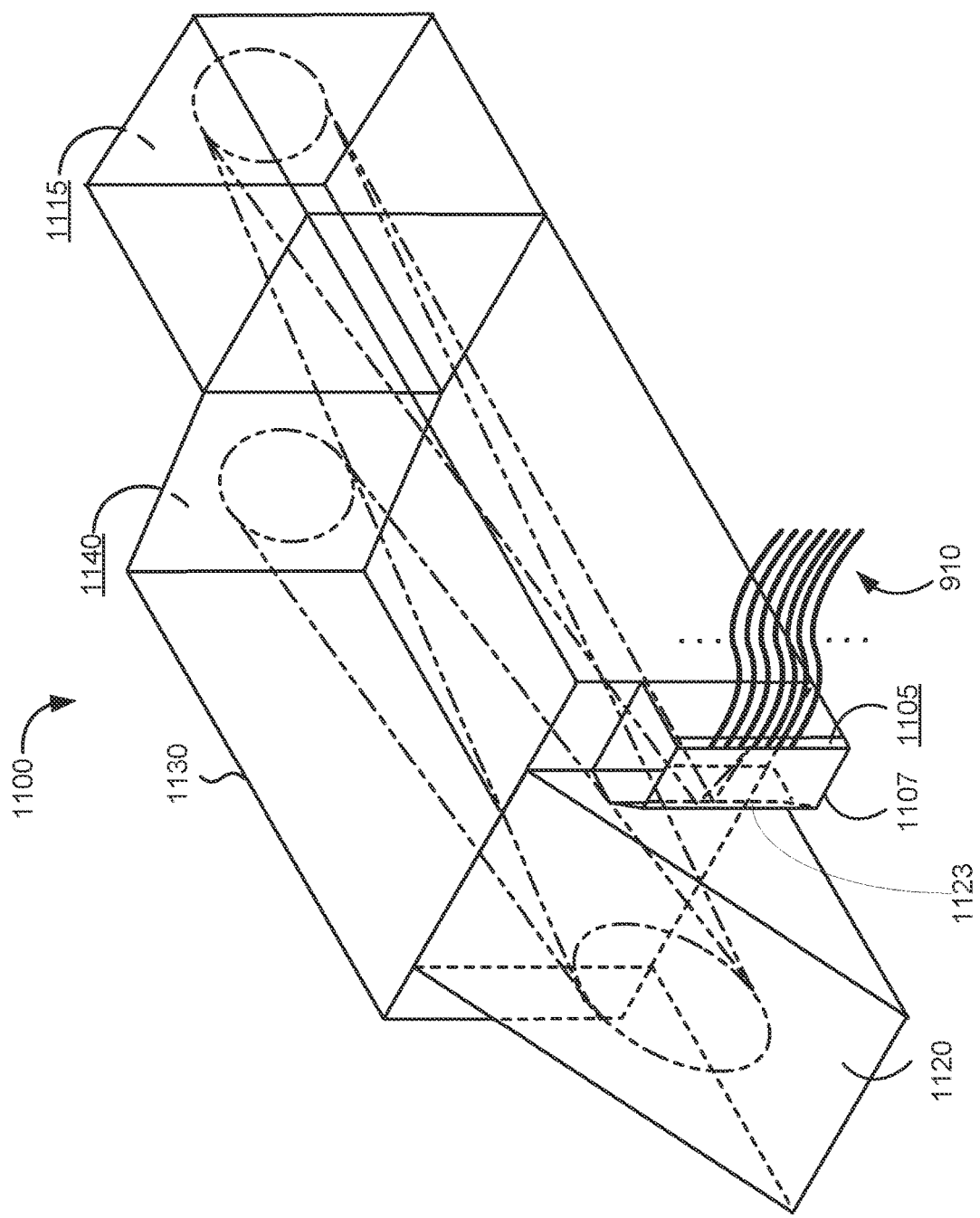
FIG. 11A is a simplified perspective view of the monolithic multispectral beam combiner according to yet another alternative embodiment of the present invention.

FIG. 11A is a simplified perspective view of the monolithic multispectral beam combiner according to yet another alternative embodiment of the present invention. As illustrated in FIG. 11A, the monolithic multispectral beam combiner 1100 includes an input surface 1105 to which a plurality of fibers are attached, for example, bonded, fused, or laser welded. The input surface can be an element of a fiber entry block 1107. After passing through the input surface 1105, the light from the input fibers 910 is reflected off of a total internal reflection surface 1123 on a face of the fiber entry block 1107 disposed along an optical path from the input surface 1105 and propagates toward collimating surface 1115. In some embodiments, the total internal reflection surface 1123 is positioned opposite the input surface, but this is not required by the present invention. Light diverges as it propagates toward the collimating surface. The collimating surface will typically be coated with a high reflectivity (HR) coating and the output surface will typically be coated with an antireflection (AR) coating.

Figure 11B:
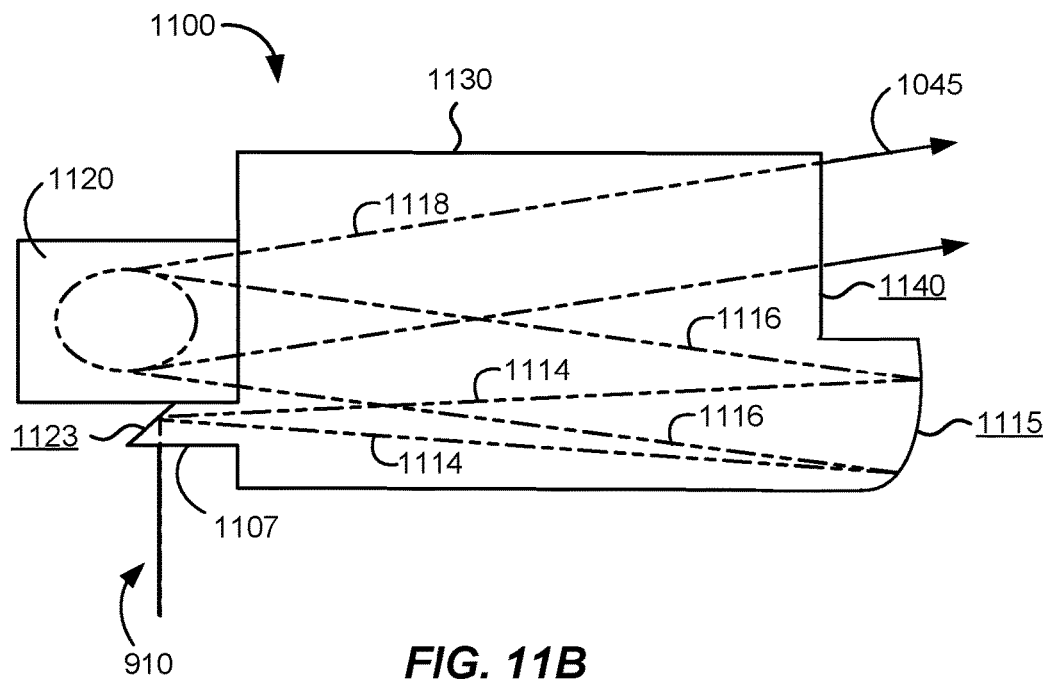
FIG. 11B is a simplified plan view of the monolithic multispectral beam combiner illustrated in FIG. 10A.

FIG. 11B is a simplified plan view of the monolithic multispectral beam combiner 1100 illustrated in FIG. 11A. In FIG. 11B, the plurality of fibers 910 are stacked into the plane of the figure. Light from the fibers propagates through the body 1130 of the beam combiner and reflects off of collimating surface 1115. Because of the curvature of the collimating surface 1115, the light from the fibers, which was expanding as it propagated through the body from total internal reflection surface 1123, is collimated by reflection off of collimating surface 1115. Accordingly, collimated beams 1116 propagate toward the grating 1120. In some embodiments, the collimating surface 1115 is formed by grinding using optical techniques to provide a surface with a curvature that will collimate the diverging beams produced using the attached fibers.

Although not illustrated in FIG. 11A, the protective cap could cover both the diffraction grating 1120 and the total internal reflection surface 1123 on the fiber entry block. In other embodiments, separate protective covers could be utilized. As an example, the total internal reflection surface could be either total internal reflection or coated. One of ordinary skill in the art would recognize many variations, modifications, and alternatives.

Figure 11C:
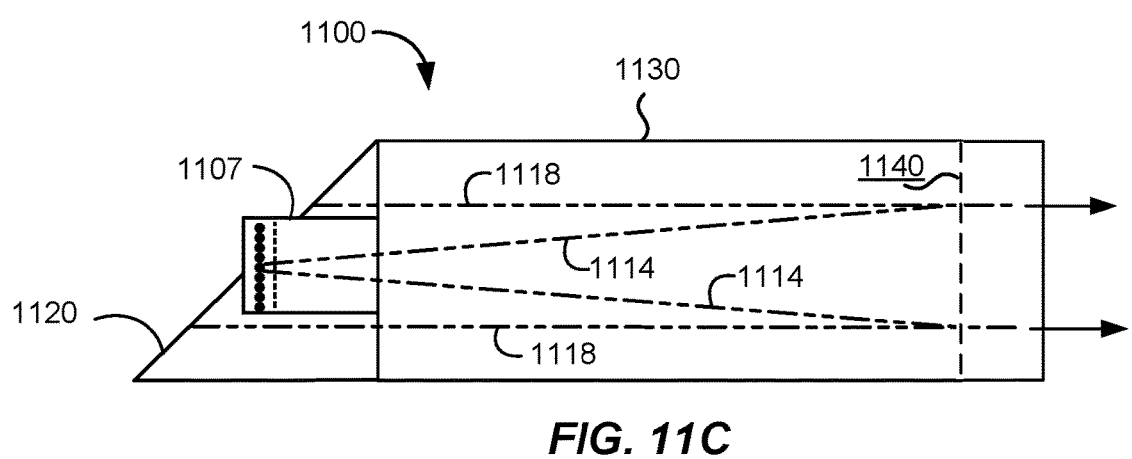
FIG. 11C is a simplified side view of the monolithic multispectral beam combiner illustrated in FIG. 11A.

FIG. 11C is a simplified side view of the monolithic multispectral beam combiner illustrated in FIG. 11A. The plurality of fibers are aligned in a plane perpendicular to the plane of the figure. Divergence of light propagating through the body 1130 toward the collimating surface is represented by light rays 1114 and collimated light propagating from the diffraction grating toward the output surface is represented by light rays 1118.

The implementation illustrated in FIGS. 11A-11C enables easy access to the fiber input surface, enabling bonding, laser welding, or the like to the beam combiner. Additionally, this implementation can provide for obstruction free alignment of the grating to the prism when the grating is not fabricated directly on the prism face. In these implementations, the grating can be optically bonded or otherwise attached after the remainder of the prism structure is assembled.

The monolithic combiners described herein can, in general, be fabricated by removing material from a single larger piece of material or by combining smaller pieces of material to generate the beam combiner. In some implementations, fabrication from a single piece of glass can be challenging. For example, surfaces utilizing a large clear aperture typically have material nearby that would inhibit conventional grinding and polishing methods as well as make coating difficult. An example in FIG. 11C is diffraction grating 1120 and the adjacent fiber entry block 1107. Other examples can be readily observed in FIGS. 10A-C and 11A-C. Therefore, embodiments of the present invention are advantageous from both fabrication and cost perspectives since they can combine multiple smaller components to fabricate the multispectral beam combiner.

Figure 12A:
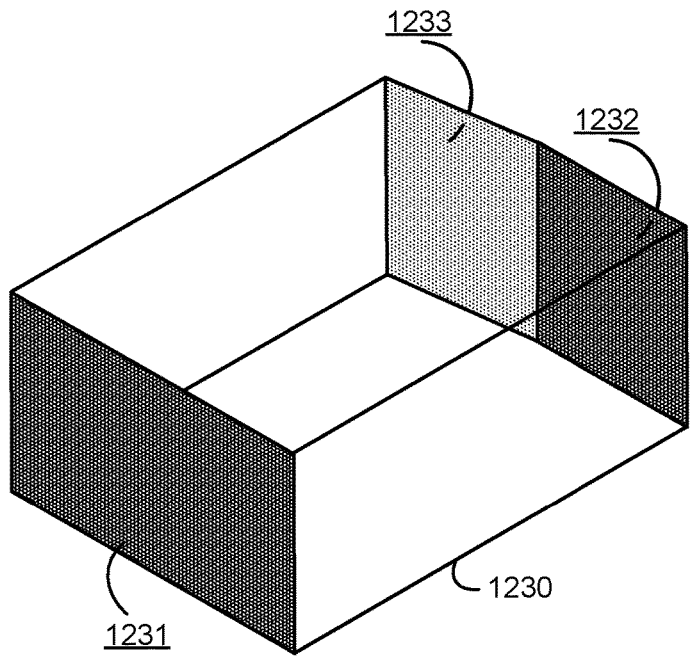
FIGS. 12A-12D illustrate components that can be assembled to form the multispectral beam combiners illustrated in FIGS. 10A and 11A.

FIGS. 12A-12D illustrate components that can be assembled to form the multispectral beam combiners illustrated in FIGS. 10A and 11A. As described herein, the multispectral beam combiners can be monolithic in nature, integrating one or more of a fiber entry block, a prism body, a collimator, and/or a grating wedge in a monolithic package with a fixed relationship between the various elements. As illustrated, for example, in FIG. 10A, the optical elements of the multispectral beam combiner are attached to form a single, monolithic unit. As an example, the various optical elements are attached at their optical interfaces to adjacent optical elements, for example, by bonding, to join (e.g., permanently join) the optical elements together, with no intervening air gap. As illustrated in FIG. 12A, the prism body 1230 can include bonding surface 1231 to which the fiber entry block 1207 and the grating wedge 1240 will be attached, for example, bonded as well as bonding surface 1232 to which the collimator 1215 will be attached. An antireflection (AR) coating 1233 can be applied to a portion of the prism body in the region of the output coupler.

Figure 12C:
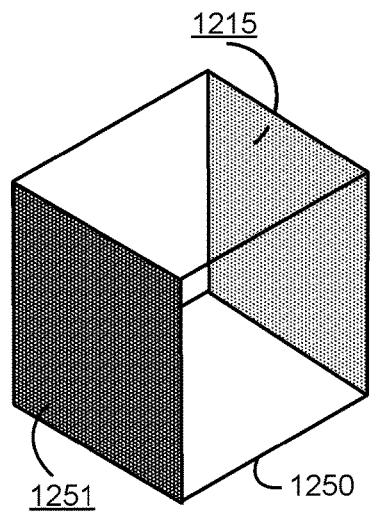
Figure 12B:
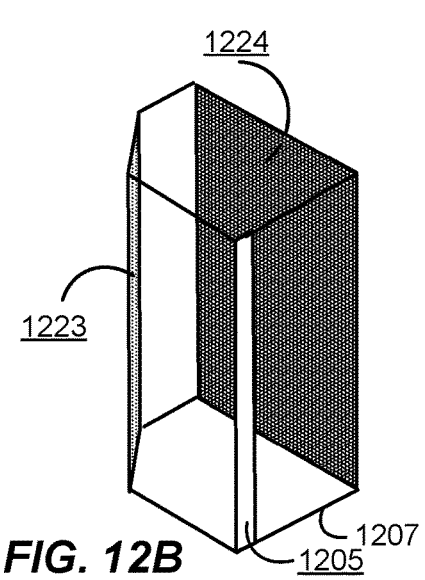
Figure 12D:
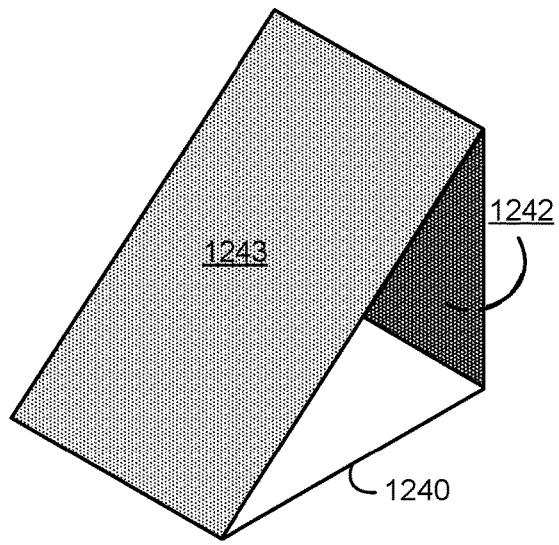

FIG. 12B illustrates the fiber entry block 1207, including the input surface 1205, the total internal reflection surface 1223, and the bonding surface 1224. FIG. 12C illustrates the collimator 1250 utilized in embodiments in which the collimating surface is not formed directly on the prism body. The collimator 1250 illustrated in FIG. 12C includes a bonding surface 1251 and the curved collimating surface 1215, which may be a spherical surface and may be coated with a high reflectivity (HR) coating. FIG. 12D illustrates the grating wedge 1240 that includes a bonding surface 1242 that can be attached to the bonding surface 1231 of the prism body 1230. The grating wedge 1240 also includes a grating bonding surface 1243 to which the grating can be attached if it is not formed directly on the grating wedge.

Using the components illustrated in FIGS. 12A-12D, the multispectral beam combiner can be assembled using optical bonding techniques, molecular bonding techniques, optical cement, or the like. Assembly using these components can result in easier and lower cost manufacturing. As an example, the modular structure can provide easy access to the optical surfaces for polishing and/or coating. Additionally, this modular structure can utilize sharply intersecting surfaces that are characterized by optical quality surfaces that may not be able to be fabricated using conventional techniques. One of ordinary skill in the art would recognize many variations, modifications, and alternatives.

Although FIG. 12A illustrates bonding surface 1232 to which the collimator 1250 is attached, in an alternative embodiment, bonding surface 1232 is replaced by a curved surface that can be ground or otherwise optically fabricated in the prism body. This curved surface can be coated with an HR coating to provide the collimating surface. Thus, in this alternative embodiment, the collimator illustrated in FIG. 12C can be eliminated by forming the collimating surface directly on the prism body.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A spectral beam combining system comprising:
a plurality of individual lasers, wherein each of the plurality of individual lasers are operable to emit one of a plurality of laser beams;
a prism having a curved input surface, wherein the curved input surface is operable to collimate the plurality of laser beams received from the plurality of individual lasers and to produce a plurality of collimated laser beams, a second surface, and an output surface, wherein the prism is operable to receive the plurality of laser beams emitted by each of the plurality of individual lasers; and
an immersion grating defined on the second surface, wherein the immersion grating is operable to receive the plurality of collimated laser beams and to produce a plurality of collimated output beams.

2. The spectral beam combining system of claim 1 wherein each of the plurality of laser beams is characterized by a different wavelength.

3. The spectral beam combining system of claim 1 wherein the curved input surface is a first surface of the prism and the output surface is a third surface of the prism.

4. The spectral beam combining system of claim 1 wherein the curved input surface implements a transform lens.

5. The spectral beam combining system of claim 1 wherein the output surface is a third surface of the prism.

6. The spectral beam combining system of claim 1 wherein the prism comprises glass.

7. The spectral beam combining system of claim 1 wherein the prism comprises fused silica.

8. The spectral beam combining system of claim 1 wherein the plurality of laser beams are incident on the curved input surface at different angles such that the plurality of laser beams are collimated and collinear after diffraction from the immersion grating.

9. The spectral beam combining system of claim 1 further comprising a protective cap attached over the immersion grating.

10. The spectral beam combining system of claim 9 further comprising a gas-filled gap disposed between the immersion grating and the protective cap.

11. A monolithic spectral beam combiner comprising:
a structure comprising:
a refractive input element operable to receive a plurality of laser beams, each of the plurality of laser beams being emitted by one of a plurality of individual lasers, wherein the refractive input element is operable to collimate the plurality of laser beams emitted by the plurality of individual lasers and to produce a plurality of collimated laser beams;
a propagation volume; and
an output surface comprising a diffraction grating, wherein the diffraction grating is operable to receive the plurality of collimated laser beams and to produce a plurality of collimated output beams.

12. The monolithic spectral beam combiner of claim 11 wherein the diffraction grating comprises an immersion grating.

13. The monolithic spectral beam combiner of claim 11 wherein the propagation volume comprises an optically transparent material.

14. The monolithic spectral beam combiner of claim 13 wherein the optically transparent material comprises glass.

15. The monolithic spectral beam combiner of claim 13 wherein the optically transparent material comprises fused silica.

16. The monolithic spectral beam combiner of claim 11 wherein the refractive input element comprises a curved surface of a prism.

17. The monolithic spectral beam combiner of claim 16 wherein the plurality of laser beams are incident on the curved surface of the prism at different angles such that the plurality of laser beams are collimated and collinear after diffraction from the diffraction grating.

18. The monolithic spectral beam combiner of claim 17 wherein each of the plurality of laser beams are characterized by a different wavelength.

19. The monolithic spectral beam combiner of claim 11 wherein the diffraction grating comprises a reflective diffraction grating.

* * * * *